C. C. TOWNSEND.
ROTARY CUTTER EARTH PLOW, CULTIVATOR, AND DITCH DIGGER.
APPLICATION FILED DEC. 28, 1916.
1,277,780.                    Patented Sept. 3, 1918.
3 SHEETS—SHEET 2
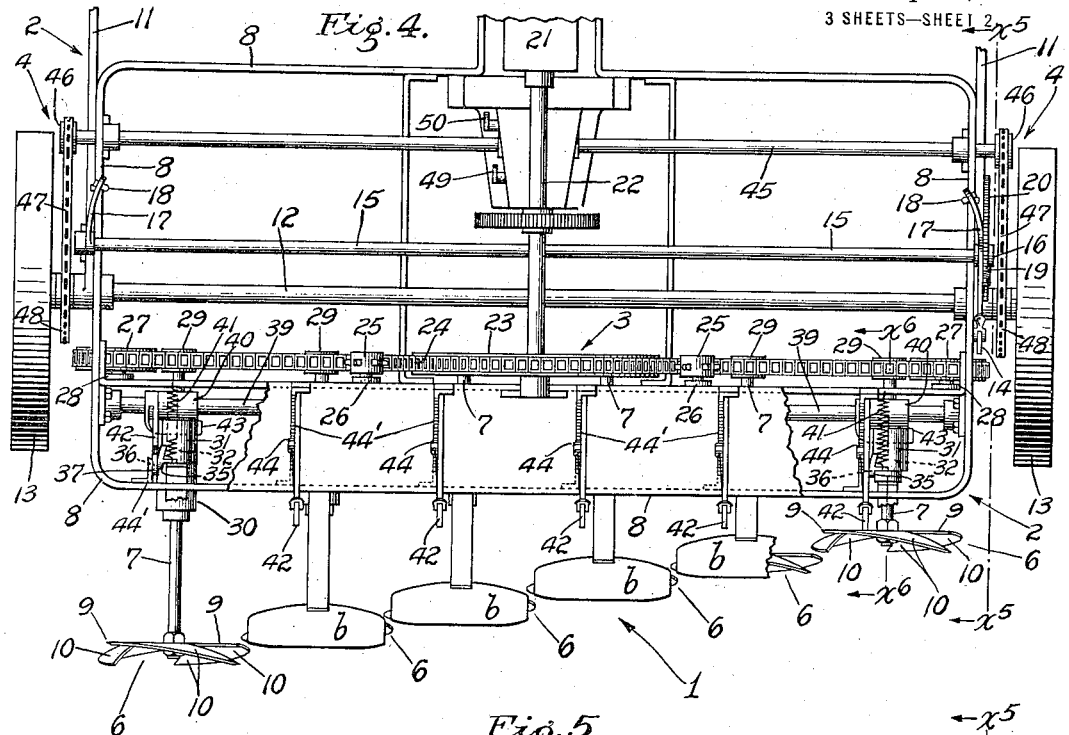
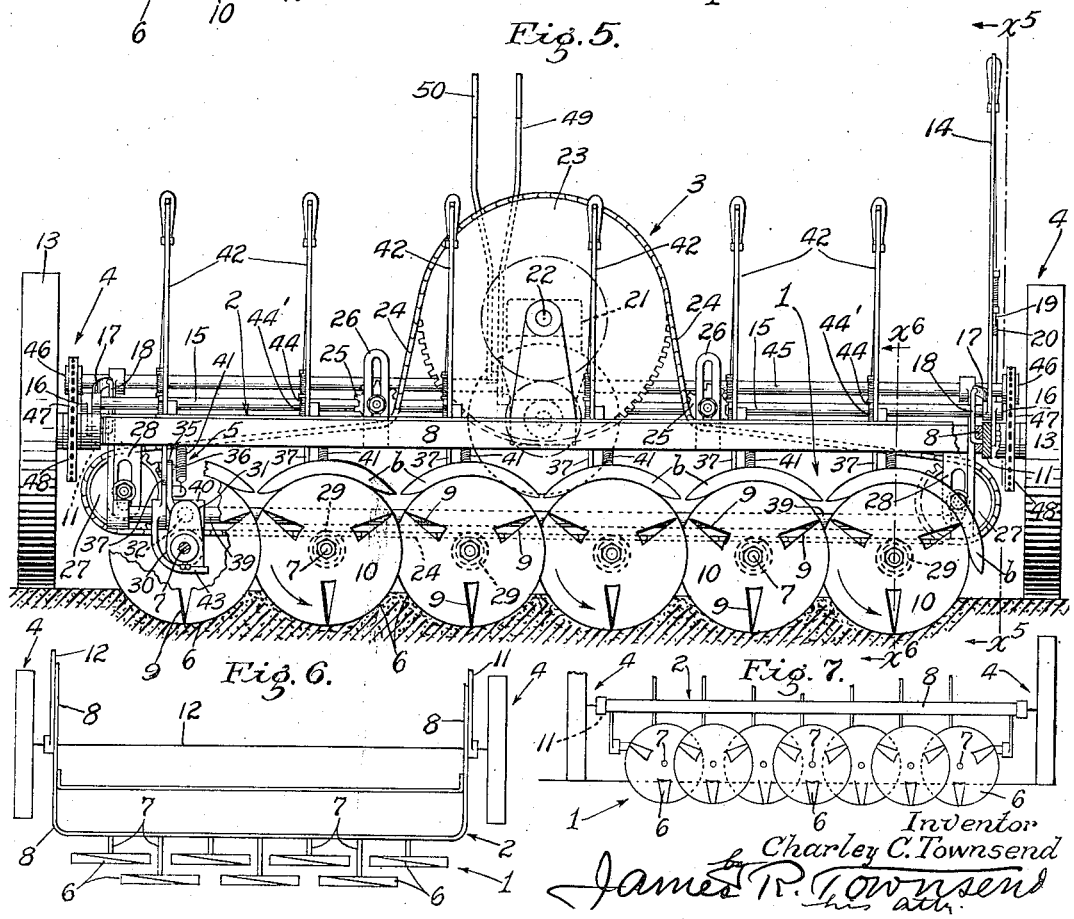
Inventor
Charley C. Townsend
by James R. Townsend
his atty.

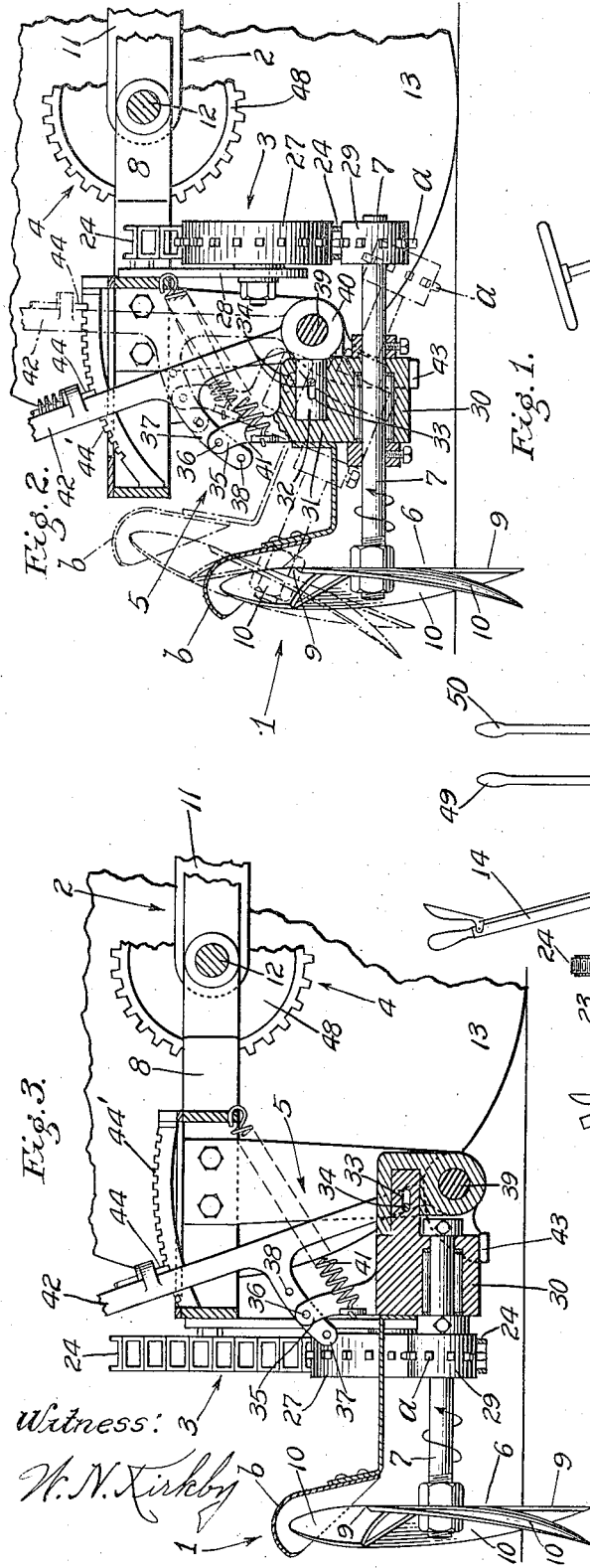
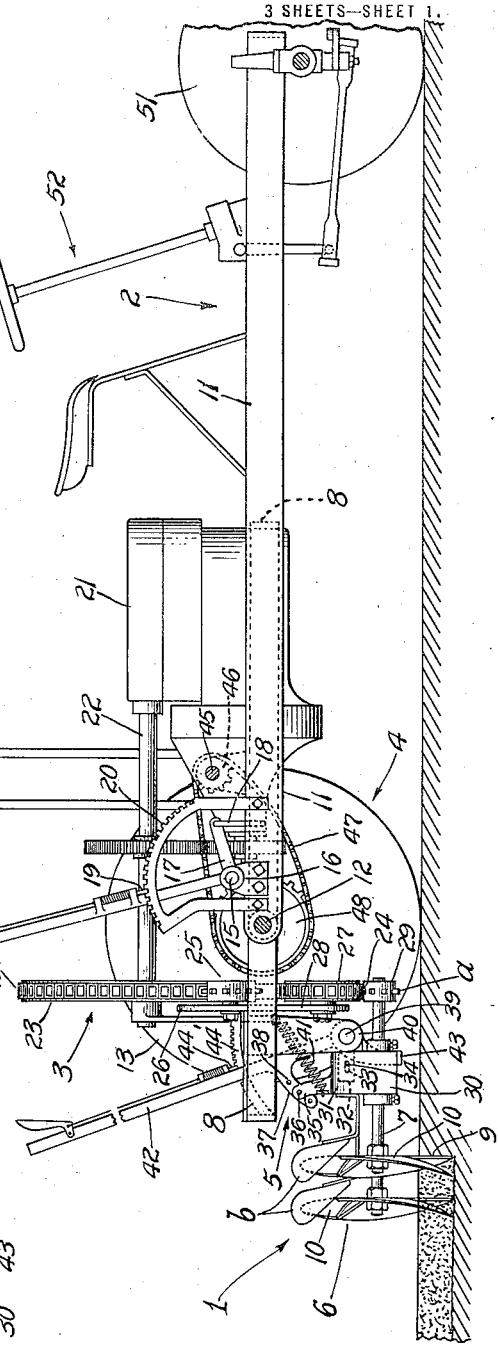

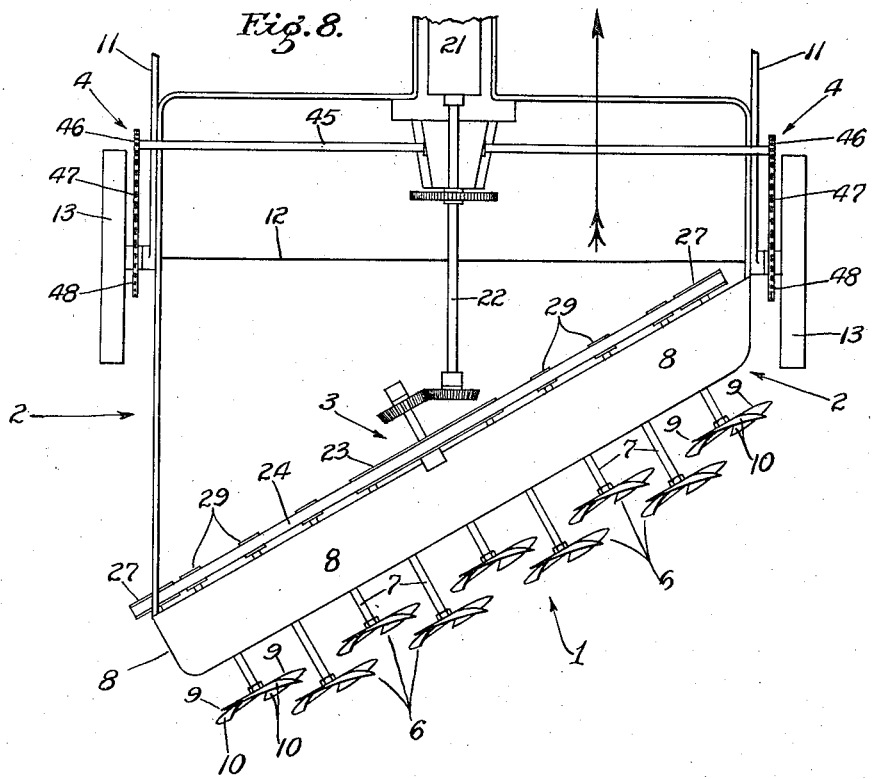

UNITED STATES PATENT OFFICE.

CHARLEY CALVIN TOWNSEND, OF RIVERSIDE, CALIFORNIA, ASSIGNOR OF ONE-FOURTH TO AUGUST FINNILA, OF LOS ANGELES, CALIFORNIA, AND ONE-FOURTH TO WILLIAM ROBERT LEVER AND ONE-FOURTH TO LAWRENCE HENRY RICH, BOTH OF RIVERSIDE, CALIFORNIA.

ROTARY-CUTTER EARTH-PLOW, CULTIVATOR, AND DITCH-DIGGER.

1,277,780.   Specification of Letters Patent.   Patented Sept. 3, 1918.

Application filed December 28, 1916.   Serial No. 139,428.

*To all whom it may concern:*

Be it known that I, CHARLEY CALVIN TOWNSEND, a citizen of the United States, residing at Riverside, in the county of Riverside and State of California, have invented a new and useful Rotary - Cutter Earth-Plow, Cultivator, and Ditch-Digger, of which the following is a specification.

An object of this invention is to provide superior means for preparing the soil for crops, either by breaking the soil or by pulverizing it, and also to provide superior means for digging ditches.

An object is to provide a power-operated machine to travel over the ground and to pulverize the soil on or below the subsoil without turning the top soil under and to leave the soil practically as it was before the breaking or cultivating process had been effected.

Another object is to provide means for rapidly breaking the soil and leaving it in condition for crop-growing in most expeditious manner and with a minimum expenditure of power and with a minimum amount of attention.

The principle of the invention is applicable in a ditch digger and I therefore do not limit my invention to any specific work.

A principle of this invention is the mounting of one or more rotary screw cutters in position to penetrate the ground peripherally and cross-wise of the line of travel to the desired depth and simultaneously rotating the cutters and moving them forward as required to perform the operation of plowing.

In carrying out this invention I provide a traveling frame and mount thereon at the rear thereof one or more rotary screw cutters in position to penetrate the ground peripherally and crosswise of the line of travel to the desired depth and independently pivoted for raising and lowering, and each cutter carrying an independent guard-shield and move said frame forwardly as required to perform the operation of plowing, and to provide power means for traveling and for rotating the cutters.

The invention may be carried out in a self-contained machine in which the engine is mounted on the frame of a motor vehicle; or the frame carrying the rotary cutter may be moved over the ground by motive power independent of the power that drives the cutters.

An object of the invention is to eliminate the necessity of the heavy tractors required to drag the plows of former construction; to avoid the expenditure of power necessary in mold board plows; to overcome the friction of the plow as it is dragged through the earth, and also the gravity and friction of the earth as it is lifted by the mold board and turned over, and thus to avoid the compression of the earth by the broad tread wheels of the heavy tractors.

I propose to pulverize the earth by rotary cutters and to avoid dragging the earth moving device through the ground.

Another object of the invention is to make provision against breakage in case the cutter should strike an obstruction likely to cause breakage.

Another object is to make provision for cutting at a uniform depth.

Other objects, advantages and features of novelty may appear from the accompanying drawings, the subjoined detail description and the appended claims.

The rotary screw cutters may be variously arranged to extend directly or diagonally across the path of the machine and they may be variously arranged relative to each other.

No attempt will be made to illustrate every form of construction which may be employed.

Figure 1 is a typical side elevation broken to contract the view and illustrating the application of the invention in a self-propelled machine in which the traction means and the plowing means are both operated by the same engine.

Fig. is an enlarged fragmental detail of one unit of the plowing apparatus as arranged in Fig. 1, parts being shown in section longitudinally of the machine.

Fig. 3 is a view analogous to Fig. 2 showing a different arrangement of the driving and safety device of the plowing apparatus.

Fig. 4 is a fragmental plan of a machine embodying this invention in one of its forms; parts being broken away to expose construction otherwise hidden.

Fig. 5 is a rear elevation of the machine shown in Fig. 4.

Fig. 6 is a diagrammatic plan of a plowing machine constructed in accordance with this invention and having its cutters arranged for producing a more even pulverization of the bottom of the plowed ground.

Fig. 7 is a rear elevation of a machine at work having the arrangement shown in Fig. 6.

Fig. 8 is a plan of a machine having an arrangement of cutters, by which the bottom of the plowed ground may be made more level than with the arrangement shown in Figs. 4–7.

A rotary plow embodying the principles of my invention comprises one or more rotary screw cutter plowing mechanisms which are indicated throughout the views in a general way by the character 1; a carriage mechanism 2 for mounting the plowing mechanism 1, and plowing power-mechanism 3 for operating the plowing mechanism 1.

In the form shown there is also traction-power mechanism 4 for traveling at a related speed with the plowing mechanism, and safety mechanisms 5 for avoiding breakage from obstruction or overload.

The details of the screw cutter plowing mechanism 1 are as follows: The screw cutters 6 are mounted upon the screw cutter shafts 7 and said shafts are mounted in a horizontal plane and parallel with each other, and are carried by the tilting frame 8, the cutters being crosswise of the line of travel of said frame. The cutters 6 have cutting edges 9 and bodies 10 winding backwardly of the edges 9. The cutters 6 may be of any approved character as knives or chisels or screw blades of considerable length, like propeller or conveyer blades.

The circular screw blade form of cutter is illustrated in Figs. 1 to 8 inclusive.

The details of the carriage mechanism 2 for mounting the plowing mechanism 1 are as follows:

The cutter frame 8 is mounted to be adjusted relative to the main carriage frame 11 that is propelled by the traction mechanism so that the cutters may be raised to clear the ground or may be lowered to penetrate the ground to the desired depth. To this end in the form shown, said cutter frame 8 is journaled on the rear axle 12, on which the traction wheels 13 of the carriage are mounted, and is controlled by the hand lever 14, that operates a rock shaft 15 mounted in side bearing 16, secured to the carriage frame 11, said rock shaft having short radius arms 17, connected by links 18 to cutter frame 8 at each side thereof, the arrangement being such that the cutter frame may be tilted about the axle 12 by power applied through lever 14, rock-shaft 15, arms 17 and links 18 and adjustably held in desired position by means of the latch 19 and quadrant 20.

The details of the plowing-mechanism 3 for operating the plowing mechanism 1 are as follows:

The motor 21 may be a gas engine driving the plow shaft 22 and its sprocket wheel 23, which drives the plowing sprocket chain 24, that is trained over the driving sprocket wheel 23 under take-up sprockets 25, that are adjustably mounted on brackets 26, and around sprocket idlers 27 that are adjustably positioned in brackets 28.

The shafts 7 of the various cutters are provided with sprockets 29 positioned in transverse alinement relative to the path of travel determined by the wheels 13, and in alinement with the idlers 27; the chain running around said idlers and meshing with the cutter shaft sprockets 29 to drive the cutter shafts and the cutters simultaneously when the shafts are in operating position.

The cutter shafts 7 are journaled in sliding and tilting journal-boxes 30 that are shiftably connected by sleeves 31 with stub-shafts 32 that are inserted into the sleeves which are adjustably held thereon by the slot and pin connection 33, 34, and are held in working position by the breakable pin releasing device 35, 36, 37 in which the pin 36 is adapted to break in case of drag or undue downward or upward strain on the cutter.

The pin 36 engages holes 38 in the bracket 37 so that the angle of the shaft 7 may be changed. The journal box is pivotally mounted on a horizontal shaft 39 that extends transversely of the frame. This is effected through the stud shaft 32 which has an eye 40 journaled on the transverse shaft 39. A spring 41 connects the journal box 30 and the frame 8 and is arranged to throw the rear end of the shaft 7 and the cutter thereon, up, whenever the pin 36 breaks, thus withdrawing the cutter from the ground and its sprocket wheel 29 from the sprocket chain.

Cutter adjusting levers 42 are provided for the respective cutters and each is pivoted on the transverse shaft 39 and provided with a depending bracket arm 43 that engages the underside of the adjacent journal box 30 for the purpose of raising and lowering the respective cutters and shafts by power applied through the levers. By means of this bracket arm 43 each cutter may be manipulated by its lever and at the same time allowed free and independent movement relative to the lever, thereby allowing the desired displacement of the cutter in case any obstruction is encountered. The levers 42 are held in adjusted position by latch 44 engaging rack 44' fixed to the tilting frame 8.

The teeth *a* of the sprocket wheels 29 of the cutter shafts are narrower than the link spaces of the sprocket chain, which drives them so that the shafts may shift endwise to break the pin 36 without displacing the sprocket chain.

The breakable pin and retracting devices including the springs connected to the tilting frame 8 and tilting journal box 30, cause immediate withdrawal of any cutter that may be subjected to overload, thus to allow the machine to proceed without breakage. The cutters may be of any desired diameters and may be provided with guards *b* to prevent the earth from being discharged peripherally when not desired. Said guards are fastened to the tilting journal boxes and move up and down with the cutters.

The bracket 37 is a portion of said lever 42 and the pin 36 is strong enough to adjust the shaft 7, so that when it is desired to lift any cutter out of the ground this may be done by manipulating the lever, and vice versa.

The cutter sprocket wheel 29 may be mounted between the cutter and the journal bearing 30, as in Fig. 3 or it may be mounted forwardly from the transverse shaft 39, being applied above or below the sprocket chain as may be required to permit its withdrawal therefrom as the cutter is lifted.

It is understood that the apparatus just described may be a trailer drawn by a traction vehicle from which power may be transmitted to drive the cutters but the form shown, in which the entire apparatus is a self contained traveling rotary screw cutter plow is preferred.

The details of the traction power mechanism 4 for traveling are as follows: The traction wheels 13 may be driven by the engine 21 through transmission means comprising a driving shaft 45 and sprocket wheels and chains 46, 47, 48. The shaft 45 is journaled on the tilting cutter frame 8 on which the engine 21 is mounted.

The relative speed of the traction power mechanism should be such that the machine will travel slower than the pitch of the screw cutters multiplied by their speed would travel. In other words if the pitch of the screw cutters is four inches to a revolution then the traction power mechanism should advance the machine about but not more than four inches while the cutter is making a revolution. The movement or displacement of the severed earth backward may be varied by varying this relation. The speed of the cutters, the pitch of the cutters and the speed of travel should be in harmonious relation, and may be changed for different soils, depths and conditions. The same engine 21 drives both shafts 22 and 45 and the relative travel of the cutters and traction wheels is determined by the relative diameters of the gearing intermediate the engine and the parts driven thereby. Clutch controlling levers 49 and 50 may be provided to operate clutch mechanism, well known in the art and concealed from view in the drawings for connecting and disconnecting the engine from and with the cutter driving mechanism and traction wheel driving mechanisms, respectively.

The front end of the frame 11 is shown provided with dirigible wheels 51, guided by the usual steering mechanism 52. In practice the levers 49 and 50 and 14 and the steering mechanism may all be grouped together to be operated by one person or a driver and attendant may be in charge of the same machine.

The method of operation will be understood from the foregoing.

I claim:—
1. In a rotary plow, a support, a power driven rotary cutter pivotally connected to the support and normally held in operative position thereon by a breakable connection and means interposed between the support and cutter for automatically elevating the cutter on breaking of said connection.

2. In a rotary plow, a support, a plurality of power-driven rotary cutters each independently pivotally connected to the support, and means for raising and lowering each cutter separately, each cutter being normally held in operative position by a breakable connection and there being means interposed between the support and cutter for automatically elevating the cutter on breaking of said connection.

3. In a rotary plow, a support, a plurality of power-driven rotary cutters each independently pivotally connected to the support, and a shield carried by each cutter, each cutter being normally held in operative position by a breakable connection and there being means interposed between the support and cutter for automatically elevating the cutter on breaking of said connection.

4. In a rotary plow, a support, a power driven rotary cutter pivotally connected to the support and normally held in operative position thereon by a breakable connection and means interposed between the support and cutter for automatically elevating the cutter on breaking of said connection and thereby throwing the cutter out of connection with the driving gear.
5. In a rotary plow, a support, a plurality of power-driven rotary cutters each independently pivotally connected to the support, and means for raising and lowering each cutter separately, each cutter being normally held in operative position by a breakable connection and there being means interposed between the support and cutter for automatically elevating the cutter on breaking of said connection and thereby throwing the cutter out of connection with the driving gear.

6. The combination with a carriage frame, of wheels supporting the front end of said frame, an axle supporting the rear end of said frame ground wheels supporting said axle, a balancing frame fulcrumed on the axle, a motor on the balancing frame in front of the axle, shafts carried by the balancing frame behind said axle, cutters fixed to said shafts, means for adjusting the shafts relative to the balancing frame, means for adjusting the balancing frame relative to the carriage frame; and means supported by the balancing frame to transmit power from the motor to the shafts.

In testimony whereof, I have hereunto set my hand at Riverside, California, this 19" day of December, 1916.

CHARLEY CALVIN TOWNSEND.

Witness:
L. H. RICH, Jr.